(12) United States Patent
Moroniti et al.

(10) Patent No.: US 11,510,541 B2
(45) Date of Patent: Nov. 29, 2022

(54) BATTERY APPARATUS FOR A ROBOT, METHODS, AND APPLICATIONS

(71) Applicant: Maidbot, Inc., Austin, TX (US)

(72) Inventors: David Moroniti, Austin, TX (US); Steve Supron, Ithaca, NY (US); Steven Whitehead, Austin, TX (US); Micah Green, Austin, TX (US)

(73) Assignee: Tailos, Inc., Austin, TX (US)

( * ) Notice: Subject to any disclaimer, the term of this patent is extended or adjusted under 35 U.S.C. 154(b) by 760 days.

(21) Appl. No.: 16/195,059

(22) Filed: Nov. 19, 2018

(65) Prior Publication Data

US 2019/0150689 A1 May 23, 2019

Related U.S. Application Data

(60) Provisional application No. 62/588,463, filed on Nov. 20, 2017.

(51) Int. Cl.
*A47L 9/28* (2006.01)
*H01M 10/42* (2006.01)
(Continued)

(52) U.S. Cl.
CPC ............. *A47L 9/2884* (2013.01); *A47L 9/009* (2013.01); *A47L 9/2826* (2013.01);
(Continued)

(58) Field of Classification Search
CPC ...... A47L 9/2884; A47L 9/009; A47L 9/2826; A47L 9/2889; A47L 11/4005;
(Continued)

(56) References Cited

U.S. PATENT DOCUMENTS

| 7,568,536 B2 | 8/2009 | Yu et al. |
| 2002/0112899 A1* | 8/2002 | Dijksman ............... A47L 9/009 180/7.1 |

(Continued)

FOREIGN PATENT DOCUMENTS

| EP | 3125336 | 2/2017 |
| GB | 2355982 | 4/2001 |

OTHER PUBLICATIONS

European Search Report for EP Application No. 18207322.1 dated Mar. 26, 2019; 8 pages.

*Primary Examiner* — Brian D Keller
(74) *Attorney, Agent, or Firm* — Fenwick & West LLP

(57) ABSTRACT

A robotic vacuum cleaner equipped with a holonomic drive that can drive in a given direction, e.g., north (assigned orientation), and move in a different direction, while maintaining its assigned orientation or that of any desired portion of the robot, such as an intake, or any other portion of the robot that is needed for a particular maneuver. The robotic vacuum cleaner includes a removable, chargeable battery system including a battery pack having batteries and a battery management system extending across all the batteries of the battery pack. A housing, including a top cover, surrounds the battery pack and the battery management system (BMS). The top cover extends over the BMS and includes a circuit board therein. A connector is at least partially connected to the BMS and extends through the housing. The connector is configured to transmit signals between the battery management system and the robotic vacuum cleaner.

7 Claims, 11 Drawing Sheets

(51) Int. Cl.
*A47L 9/00* (2006.01)
*A47L 11/40* (2006.01)
*H02J 7/00* (2006.01)

(52) U.S. Cl.
CPC ........... *A47L 9/2857* (2013.01); *A47L 9/2889* (2013.01); *A47L 11/4005* (2013.01); *A47L 11/4061* (2013.01); *A47L 11/4066* (2013.01); *H01M 10/4257* (2013.01); *H02J 7/0013* (2013.01); *A47L 2201/00* (2013.01); *A47L 2201/022* (2013.01); *A47L 2201/04* (2013.01); *H01M 2010/4271* (2013.01)

(58) Field of Classification Search
CPC ............. A47L 11/4066; A47L 2201/00; A47L 2201/04; A47L 9/1418; A47L 9/2868
See application file for complete search history.

(56) References Cited

U.S. PATENT DOCUMENTS

| | | | |
|---|---|---|---|
| 2012/0103705 A1* | 5/2012 | Schlee | B25J 9/06 |
| | | | 180/14.1 |
| 2016/0095487 A1 | 4/2016 | Koura et al. | |
| 2016/0095488 A1* | 4/2016 | Lee | A47L 9/2842 |
| | | | 15/319 |
| 2016/0309973 A1* | 10/2016 | Sheikh | A47L 11/282 |
| 2017/0027399 A1 | 2/2017 | Kwon et al. | |
| 2017/0071431 A1 | 3/2017 | Reed et al. | |
| 2017/0245718 A1* | 8/2017 | Son | A47L 9/2884 |
| 2017/0324259 A1 | 11/2017 | Jung et al. | |
| 2017/0336798 A1* | 11/2017 | Nam | A47L 9/1666 |
| 2019/0110652 A1 | 4/2019 | Moroniti et al. | |
| 2019/0117032 A1 | 4/2019 | Supron et al. | |
| 2019/0189981 A1* | 6/2019 | Neumann | H01M 50/20 |
| 2020/0216129 A1* | 7/2020 | Sutherland | A61L 2/26 |

\* cited by examiner

BATTERY APPARATUS FOR A ROBOT, METHODS, AND APPLICATIONS

CROSS-REFERENCE TO RELATED APPLICATION

This application claims priority to U.S. Provisional Patent Application Ser. No. 62/588,463, filed on Nov. 20, 2017, and entitled "Battery Apparatus for a Robot, Methods, and Applications," the entire disclosure of which is incorporated herein by reference.

BACKGROUND OF THE INVENTION

1. Field of the Invention

The present disclosure is directed generally to a battery apparatus for a robotic platform and associated methods and applications; more particularly to a swappable battery apparatus for a robotic platform and associated methods and applications; and most particularly to a swappable battery pack and battery management system (BMS) for a robotic platform, methods including logistics pertaining to battery parameters, and applications thereof.

2. Description of Related Art

Cleaning patterns available to be executed with existing robotic floor cleaners are limited by their architecture, control, sensing and drive systems. Commercial robotic vacuum cleaners such as the Dyson® Eye, the Roomba®, and many of Samsung's models use a non-holonomic drive system; i.e., the drives use two independently powered wheels and a caster to provide 3-point support for their robotic vacuum cleaners. The two independently powered wheels can be used to move the robot body in a straight line, a curved line, or to spin; however, each of these drive systems are only able to move the robotic vacuum cleaner in a direction that is not perpendicular to the assigned (fixed) orientation of the robotic vacuum cleaner.

When non-holonomic robots move, e.g., northerly and then easterly, the robot must drive north, spin 90 degrees to the right, and drive east or, alternatively; they could drive north, rotate 90 degrees to the right while moving forward through an arc, and then drive east. In any case, the non-holonomic drive robotic vacuum cleaner began facing in one direction (e.g., north, south, east, west) and finished facing in a different direction, e.g., (east, west).

A robotic vacuum cleaner equipped with a holonomic drive can drive in a given direction, e.g., north (with its assigned orientation being north) and move in a different direction, e.g., east, north-east, or any direction) while maintaining its assigned orientation or that of any desired portion of the robot such as an intake, bank of sensors, or any other portion of the robot that is needed for a particular maneuver.

Robotic vacuum cleaners and other battery-powered robots typically use a charging station to charge an internal battery. When the battery charge has been depleted the robot typically docks to a charging station and sits idle while the battery recharges. During this charging interval, the robot cannot be used.

Further, robotic cleaning systems may not have a prior understanding of the environment that they are in nor, as a result, the amount of time, energy, battery charge, etc. that it will take to complete an assigned task. This makes predicting power usage and operating time of the robot difficult. Robotic floor cleaners, for example, will continue running until the internal battery charge drops below a threshold (e.g., voltage or consumed coulombs) that will then trigger the robot's return to a charging station. In an industrial cleaning setting, hitting this threshold when the job is not done is disruptive to the process and increases inefficiencies. Moreover, as the battery supplies all of the power to the robot, removal of the battery for replacement results in an immediate depowering of all power systems in the robot.

The inventors have recognized the benefits and advantages of enabling a robot to function essentially continuously, without significant interruption due to off-job battery charging or battery replacement.

SUMMARY OF THE INVENTION

The present disclosure is directed to a robotic vacuum cleaner equipped with a holonomic drive that can drive in a given direction, e.g., north (with its assigned orientation being north) and move in a different direction, e.g., east, north-east, or any direction) while maintaining its assigned orientation or that of any desired portion of the robot such as an intake, bank of sensors, or any other portion of the robot that is needed for a particular maneuver. In particular, the present disclosure is directed to a removable, chargeable battery system for a robotic vacuum cleaner.

According to an aspect, the present invention is a removable, chargeable battery system for a robotic vacuum cleaner, which includes a battery pack having one or more batteries and a battery management system (BMS) extending across all of the one or more batteries of the battery pack. The system also includes a housing which is configured to store the battery pack and the battery management system therein. The housing a top cover that extends over the battery management system. The top cover has a circuit board therein. A connector is at least partially connected to the battery management system and extends through the housing. The connector is configured to transmit signals between the battery management system and the robotic vacuum cleaner.

According to an embodiment, the system includes a capacitive touch sensor within the top cover and operably connected to the circuit board.

According to an embodiment, the system includes a light source on the top cover and operably connected to the circuit board.

According to an embodiment, the light source is a tri-colored LED light.

According to an embodiment, the top cover is translucent.

According to an embodiment, the connector is configured to mate with a connector of a charging station.

According to another aspect, the present invention is a robotic vacuum cleaner. The robotic vacuum cleaner has (i) a main body having a front, top and bottom; (ii) a vacuum source positioned at the front of the main body; (iii) a plurality of sensor elements mounted to the main body; (iv) a plurality of wheel assemblies that collectively form a holonomic drive, each wheel assembly comprising: (a) a motor; (b) a drive wheel connected to the motor; (c) an encoder; and (d) a motor controller. The robotic vacuum cleaner also includes (v) a main controller that receives odometry data from the motor controller in regard to the movement of the wheel, and data from the plurality of sensors, and provides electronic navigation control to the plurality of wheel assemblies. The robotic vacuum cleaner further includes a removable, chargeable battery system within a socket on the main body. The removable, chargeable battery includes a battery pack having one or more batteries and a battery management system (BMS) extending across all of the one or more batteries of the battery pack. The system also includes a housing which is configured to store the battery pack and the battery management system therein. The housing a top cover that extends over the battery management system. The top cover has a circuit board therein. A connector is at least partially connected to the battery management system and extends through the housing. The connector is configured to transmit signals between the battery management system and the main controller.

According to an embodiment, the robotic vacuum cleaner includes a capacitive touch sensor within the top cover and operably connected to the circuit board.

According to an embodiment, the robotic vacuum cleaner includes a light source on the top cover and operably connected to the circuit board.

According to an embodiment, the light source is a tri-colored LED light.

According to an embodiment, the top cover is translucent.

According to an embodiment, the connector is configured to mate with a connector of a charging station.

These and other aspects of the invention will be apparent from the embodiments described below.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
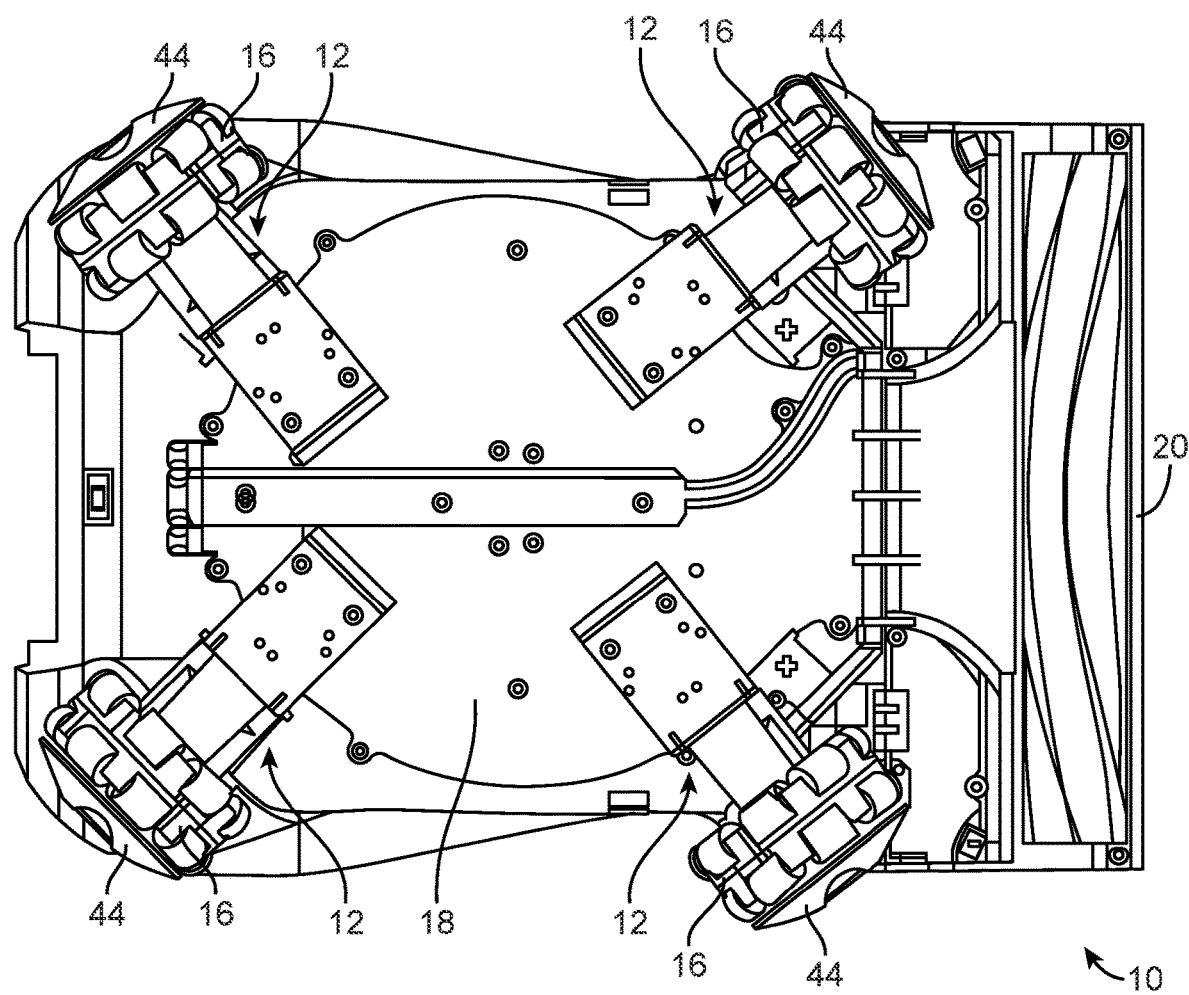
FIG. 1 is a schematic bottom plan view of a holonomic drive platform of a robotic floor cleaner, in accordance with an embodiment.

The present disclosure describes a robotic vacuum cleaner, designated generally by reference numeral 10. Referring now to the figures, wherein like reference numerals refer to like parts throughout, FIG. 1 is a schematic bottom plan view of a holonomic drive platform of a robotic floor cleaner (i.e., the "robot") 10 according to an illustrative embodiment of the invention. The robot 10 shown in FIGS. 1-5 is shown and described in U.S. patent application Ser. No. 16/162,463, filed on Oct. 17, 2018 and entitled "Robotic Apparatus, Method, and Applications," the entirety of which is incorporated herein by reference.

The robot 10 shown in FIG. 1 includes four (4) omni wheel assemblies 12 each having an independent drive motor 14 for the drive wheels 16 and suspension 18 (details of the suspension 18 can be found in Applicant's U.S. patent application Ser. No. 16/164,871, filed Oct. 19, 2018, the entirety of which is hereby incorporated by reference). Embodiments can be enabled with three (3) or four (4) wheel assemblies 12 so long as they are in a proper configuration as one skilled in the art would appreciate. The wheel assemblies 12 are arranged such that the robot 10 is positionally stable and can be directed to move in any directions (straight and/or curvilinear) by varying the speed and direction of rotation of the drive wheels 16 in each wheel assembly 12. In the apparatus in FIG. 1, driving all four wheel assemblies 12 in the same direction causes rotation of the robot 10. If the wheels 16 on one side turn one direction and the wheels 16 on the other side turn in the opposite direction, the robot 10 drives forward or backward. Driving a pair of diagonally opposed wheel assemblies 12 in the one direction and the other pair of diagonally opposed wheel assemblies 12 in the opposite direction the robot 10 will move linearly sideways. Various combinations of the wheel assembly 12 drive motions allows for robot motion in any direction with any rotation (including no rotation at all).

Figure 2:
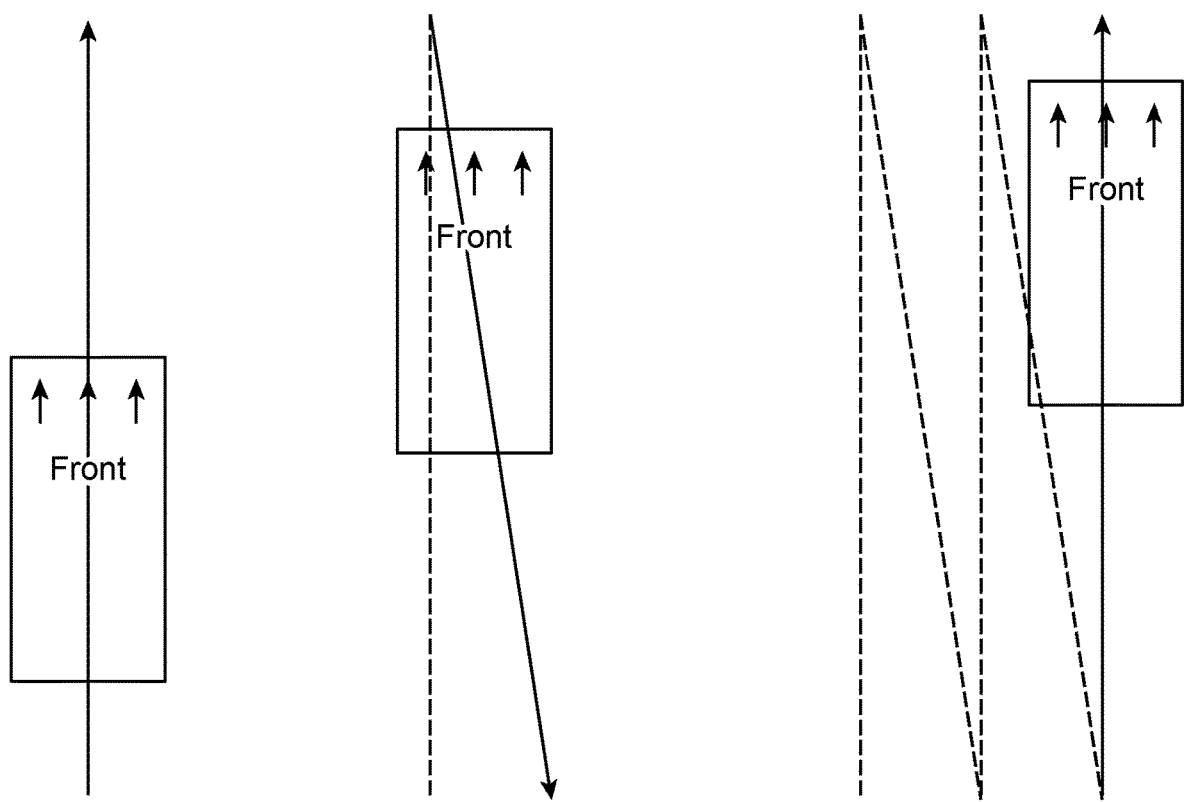
FIG. 2 illustrates the common N-pattern that is frequently used when vacuuming a floor using a conventional hand-operated vacuum cleaner or other floor cleaner.

Turning now to FIG. 2, there is shown the common N-pattern that is frequently used when vacuuming a floor using a conventional hand-operated vacuum cleaner or other floor cleaner. The embodied robot 10 with a holonomic drive can cover the N-pattern, for example, while maintaining the orientation of the cleaning intake 20 (FIG. 1). This pattern/orientation may be very useful for cleaning the edge regions of a floor bounded by a wall or border. Additionally, the amount of turning the robot 10 must do throughout the cleaning of a room is reduced, lowering the overall time to clean.

Figure 3:
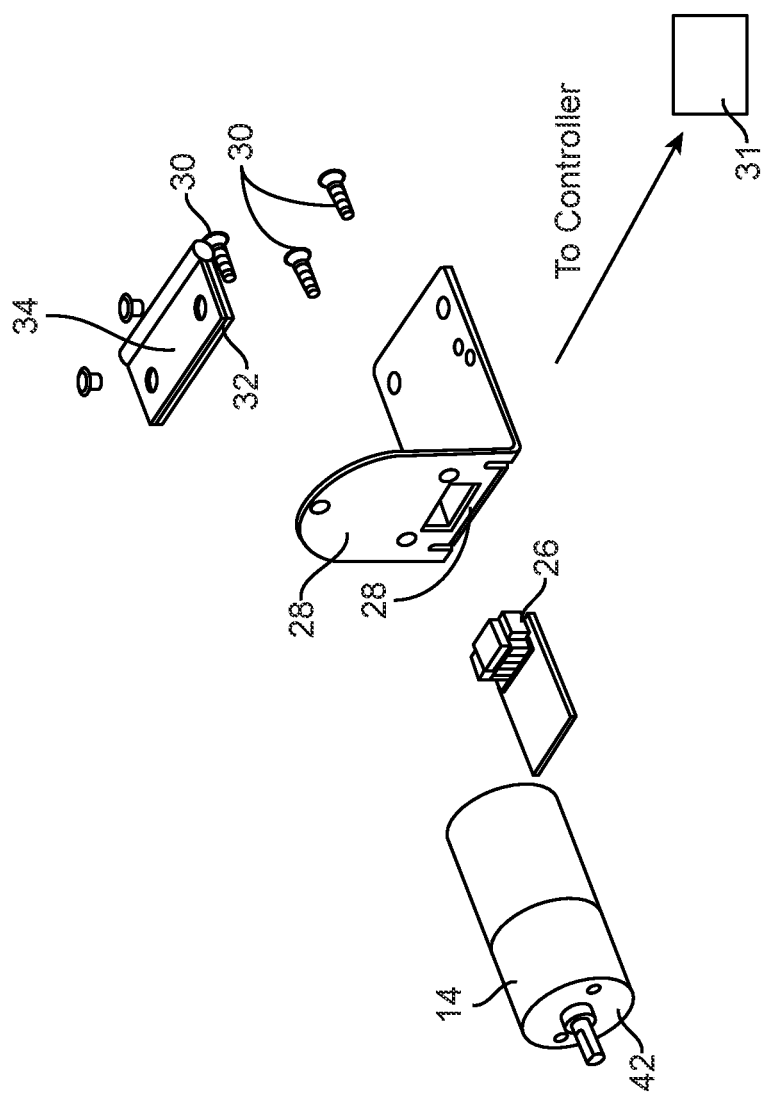
FIG. 3 is an exploded perspective view of a wheel assembly, in accordance with an embodiment.
Figure 3:
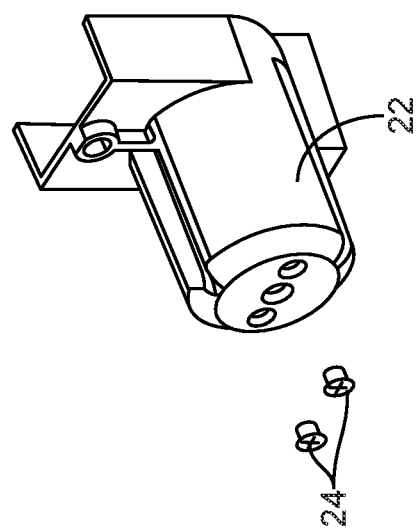
Figure 4:
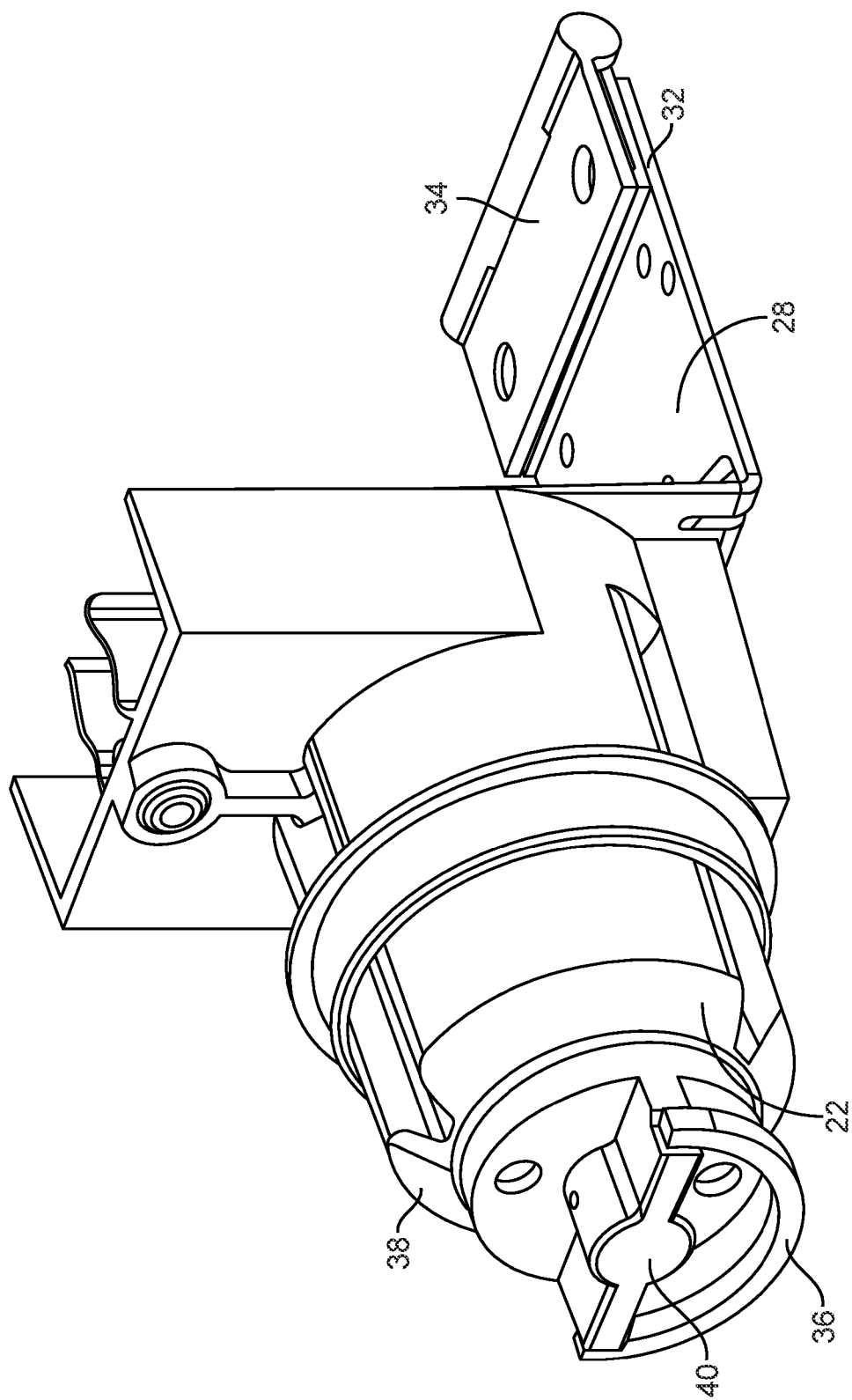
FIG. 4 is a perspective view of a wheel assembly, in accordance with an embodiment.

Referring now to FIGS. 3-4, there are shown four wheel bracket assemblies 12, each of which are of identical physical construction. A DC gear motor 14 is mounted within a plastic molded motor pod 22 and secured with screws 24. A motor controller PCBA 26 slides within the motor pod 22. A harness (not shown) connects the motor 14 to the motor controller 26. The motor bracket 28 is fixed to the motor pod 22 with three self-tapping screws 30. The bracket 28 secures the motor controller 26. An access hole 30 in the bracket 28 allows connection of a harness that connects to the main logic controller 31 of the robotic floor cleaner 10. One side of the hinge 32 is secured to the bracket 28 and the other side of the hinge 34 is fixed to the robotic cleaner's base plate/suspension 18.

The motor pod 22 provides support for a suspension spring clip 36. A drive hub 38 is pressed to the end of the motor 14. Additionally, a dowel pin 40 can further reinforce the coupling of the gear motor 14 to the drive hub 38 by pressing through the motor hub 38 and pressing into the motor shaft 42. The motor hub 38 transmits torque to the drive wheel 16 through its slotted shape. A pod ring 44 of special lubricated material may be used to support the wheel 16 and provide a low friction bearing surface.

Figure 5:
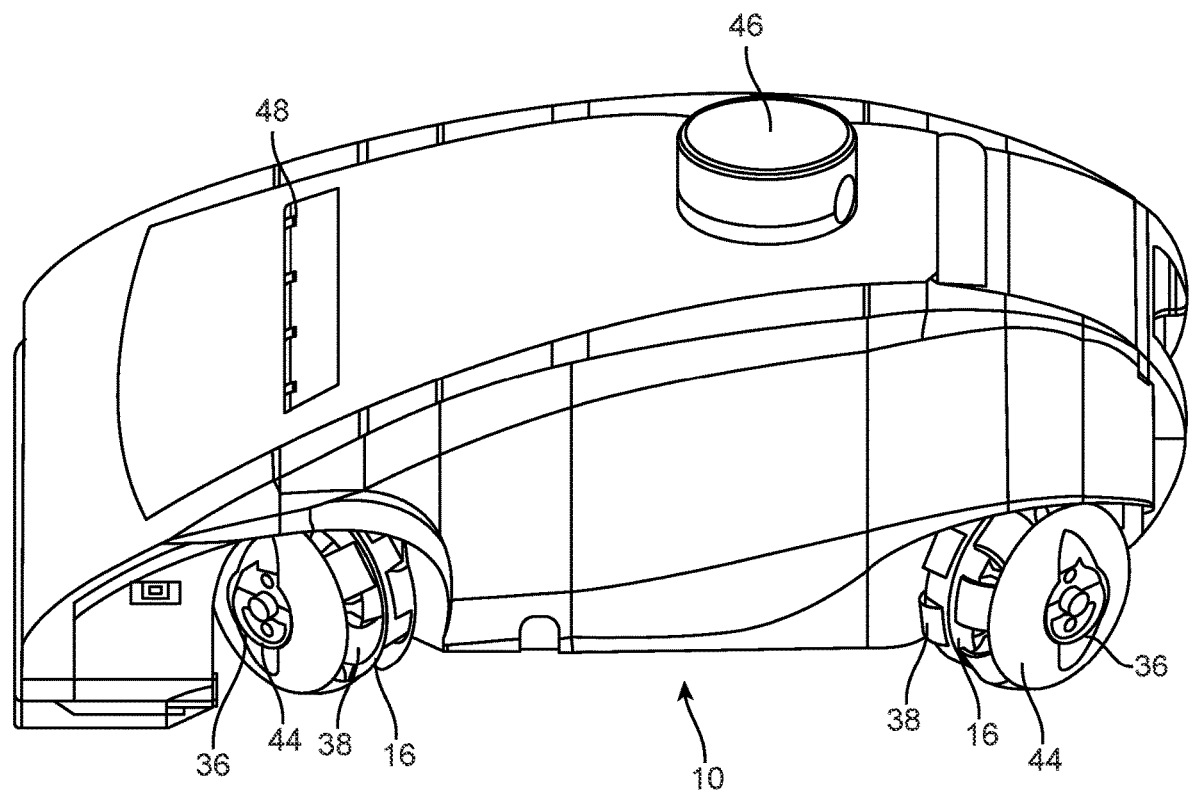
FIG. 5 is a perspective view of a robotic floor cleaner, in accordance with an embodiment.

Turning now to FIG. 5, the robotic floor cleaner 10 is shown with wheels 16 fully installed. The snap clips 36 (FIG. 4) are used to secure the wheel 16 to the drive hub 38 in an easily removable manner. Each robotic wheel 16 includes a reversible motor and encoder. The encoder signal provides feedback to the motor's controller 26. The motor controllers 26 communicate with the main controller 31 to provide odometry data on the movement of the wheel 16. The odometry information, coupled with feedback from a LIDAR 46 mounted atop robot 10 and other sensors 48 provide data to the main controller 31 advantageous for navigation.

According to an embodiment, the environment in which the robot 10 is tasked to operate will be identified and parameters affecting task completion capability will be processed by the robot 10 and communicated to an operator (e.g., motor controller PCBA 26). The workspace is thus identified through input of an identifier, such as, e.g., a hotel room name or number, sent via a centralized command system, or ascertained from environmental/situational factors (to the motor controller 26). A previously created map of the space can be loaded and a desired cleaning path planned through the space and executed. Specifics of the path such as length, number of turns, and average velocity can be used to calculate an estimated time to perform the task. This time can be translated into a power requirement and compared to a charge status of a power source (e.g., battery or battery pack) of the robot 10. If the power source does not have a charge status where it can successfully finish the space, an alert can be transmitted to charge/replace the power source before starting the task and avoiding interruptions. If the decision is made by the user to proceed cleaning regardless, when the robot 10 runs out of power from the power source in the process of the task, a replaceable power source can be swapped for a fresh power source quickly and simply. Alternatively, the robot 10 may be selectively programmed to optimize task performance in light of the power requirements and proceed automatically or upon instruction to do so.

Figure 6:
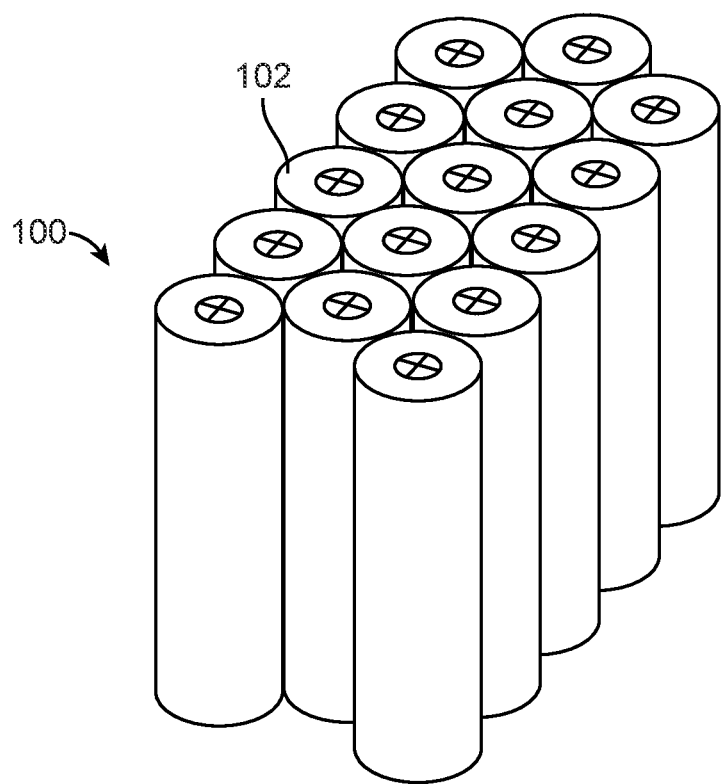
FIG. 6 is a perspective view schematic representation of a battery pack, according to an embodiment.
Figure 7:
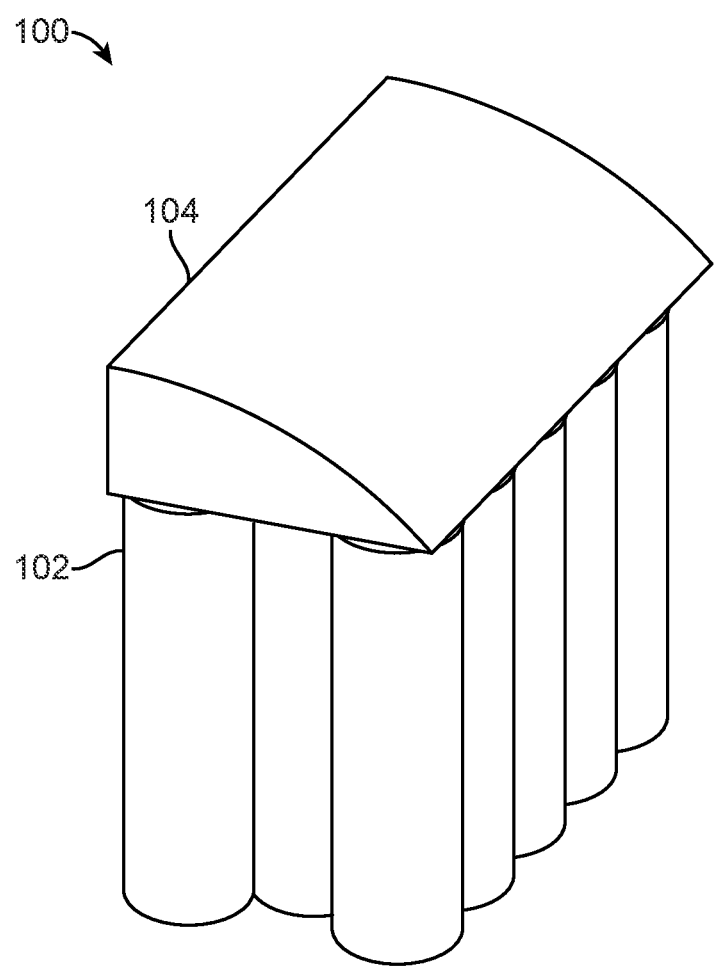
FIG. 7 is a perspective view schematic representation of a battery pack with a battery management system (BMS), according to an embodiment.

As described above, the components of the robot 10 described above are powered by a power source. Conventional power sources can be chargeable or disposable. The power source of the robot 10 described above is both chargeable and removable/replaceable. In an embodiment, the replaceable power source is a battery pack 100. FIG. 6 is a perspective view schematic representation of a battery pack 100, according to an embodiment. In the depicted embodiment, the battery pack 100 comprises one or more batteries 102. The batteries 102 may be arranged or stored such that at least two batteries 102 are in contact. As shown in FIG. 6, the batteries 102 are arranged in rows. The battery pack 100 comprises a battery management system (BMS) 104 which contacts all batteries 102 in the battery pack 100, as shown in FIG. 7.

Figure 8:
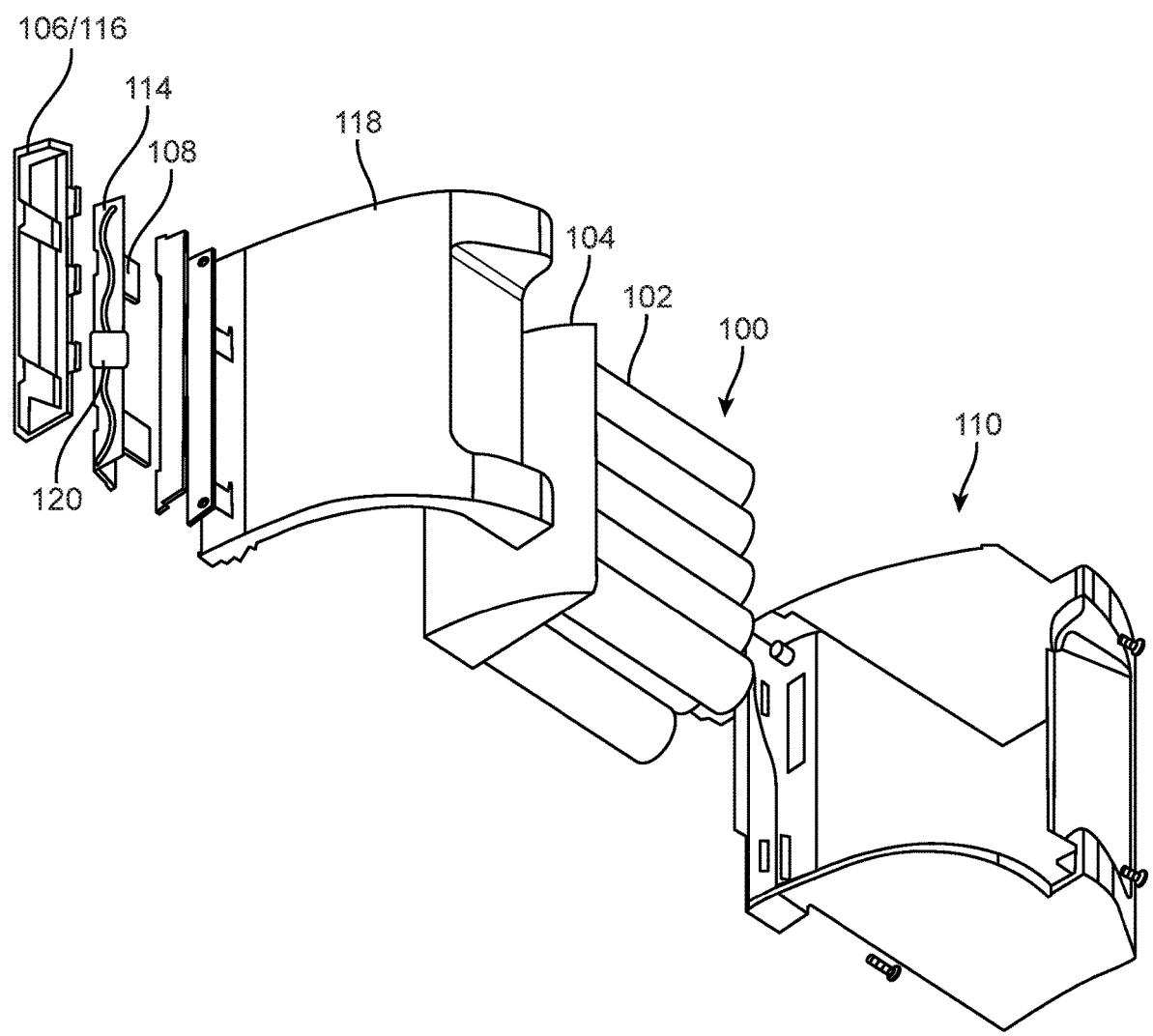
FIG. 8 is an exploded view schematic representation of a battery pack, indicator LEDs, and connector, according to an embodiment.

Referring now to FIG. 8, there is shown an exploded view schematic representation of a battery pack 100, indicator LEDs 106, and connector 108, according to an embodiment. As shown in FIG. 8, the battery pack 100 with the BMS 104 is packaged or maintained within a housing 110. The housing 110 may be composed of any durable, lightweight material, such as plastic. In the depicted embodiment, the housing 110 comprises a connector 108 for mating to the robot 10 or to a charging station 112 for recharging.

In an exemplary embodiment, a circuit board 114 with a light source 116 can illuminate through a translucent top cover 118 of the housing 110. The light source 116 can be any conventional light source(s), such as tri-colored LED lights. In an embodiment, the circuit board 114 is configured with capacitive touch sensors 120 that can detect when a hand is touching the translucent top cover 118 of the housing 110. When a hand is detected by the capacitive touch sensors 120, the light source 116 (e.g., tri-colored LED lights) are illuminated to show a charge status of the battery pack 100.

In one example, when the tri-colored LED lights 116 are illuminated in red, the charge status indicates little charge remaining (i.e., below a minimum threshold). As follows, when the tri-colored LED lights 116 are illuminated in yellow, the charge status indicates a partial charge (i.e., between the minimum threshold and a maximum threshold), and when the tri-colored LED lights are illuminated in green, the charge status indicates a full charge (i.e., above the maximum threshold). In an alternative embodiment, the light sources 116 are a plurality of LED lights array of multiple individual lights such that a combination of colors can be used to indicate multiple charge statuses (i.e., levels of completeness of charge). Thus, a user can determine the charge status of a battery pack 100 without having to use any other system to inquire into its charge status. In alternative embodiments, the charge status of the battery pack 100 can also be indicated by any other visual or auditory cues activated by a trigger on the battery pack 100 such as a touch panel, button, or contact pad. Potential cues could include a color display, sound(s), etc. to indicate charge.

Figure 9:
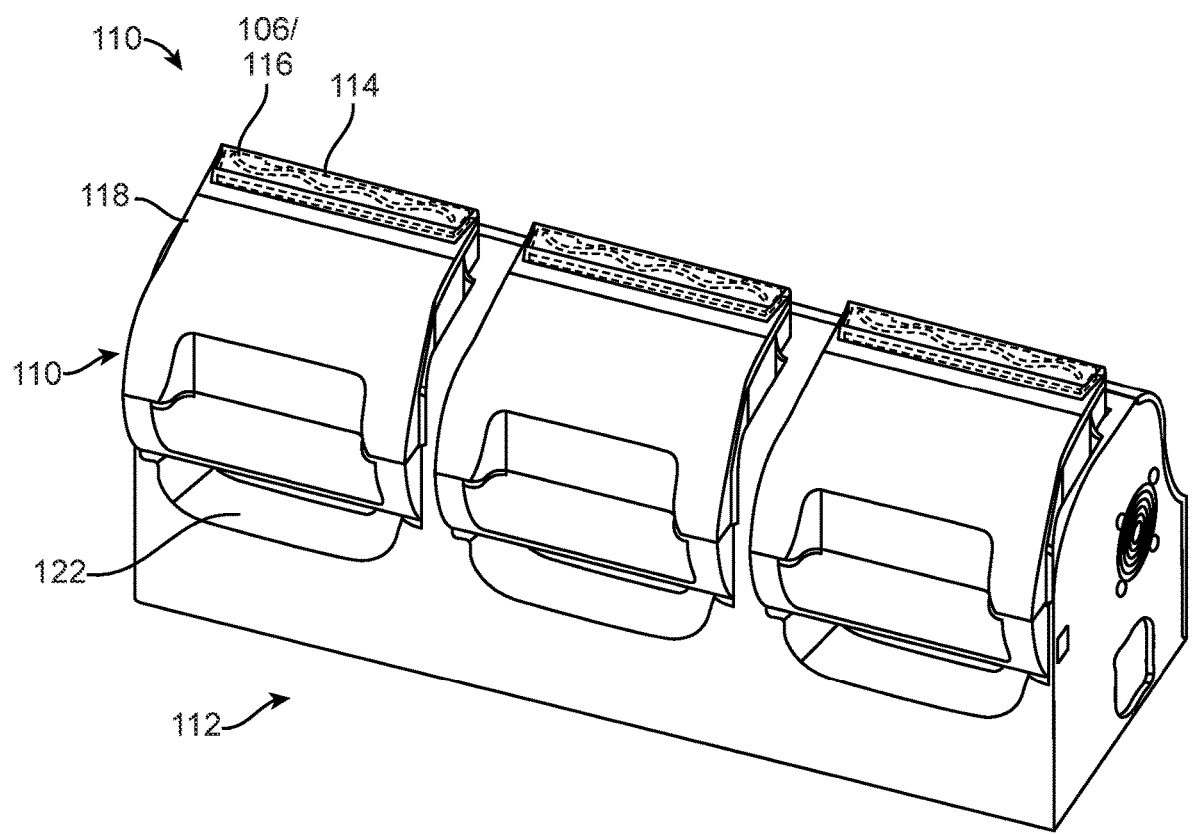
FIG. 9 is a perspective view schematic representation of a charging station, according to an embodiment.

In an embodiment, one or more battery packs 100 can be charged on a remote charging station to ensure that there is always a sufficient supply of power for the robot 10 to complete its tasks continuously. Referring now to FIG. 9 is a perspective view schematic representation of a charging station 112, according to an embodiment. The charging station 112 shown in FIG. 9 is configured to charge three battery packs 100; however, the charging station 112 can be configured to charge any number of battery packs 100 organized in any conceivable arrangement. Each battery pack 100 slides into a slot 122 on the charging station 112. The battery pack 100 slides into the slot 122 until the connector 108 of the battery pack 100 makes contact with the charging station 112. The weight of the battery pack 100 holds the battery pack 100 in place in the slot 122 of the charging station 112. Because the weight of the battery pack 100 maintains the battery pack 100 in place in the charging station 112, the battery pack 100 can be easily removed (lifted) from the slot 122 without the use of tools to minimize downtime. This allows for near continuous use of the robot 10 in its desired operating area without slowing down a human or other process.

Figure 10:
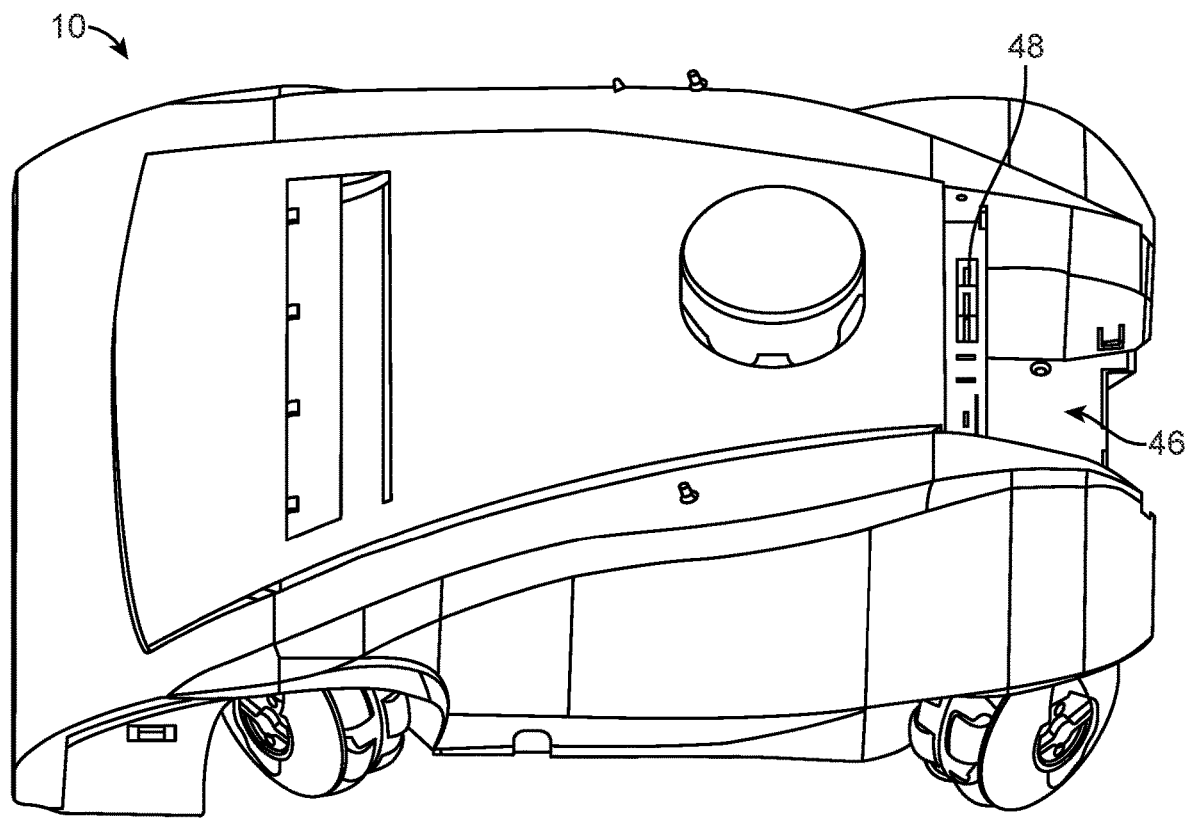
FIG. 10 is a top perspective view schematic representation of a robot with a socket and connector for a swappable battery pack, according to an embodiment.

Turning now to FIG. 10, there is shown a top perspective view schematic representation of a robot 10 with a socket 46 and connector 48 for a battery pack 100, according to an embodiment. As shown in FIG. 10, the robot 10 comprises a socket 46 configured to receive a battery pack 100. In the depicted embodiment, the robot 10 comprises one socket 46 sized and configured to receive one battery pack 100 therein; however, the robot 10 may be configured such that it has multiple sockets 46 to accommodate multiple battery packs 100. As also shown in FIG. 10, each socket 46 comprises a connector 48 for attaching the battery pack 100 to the robot 10. The connector 48 may include electrical and mechanical connections.

Figure 11:
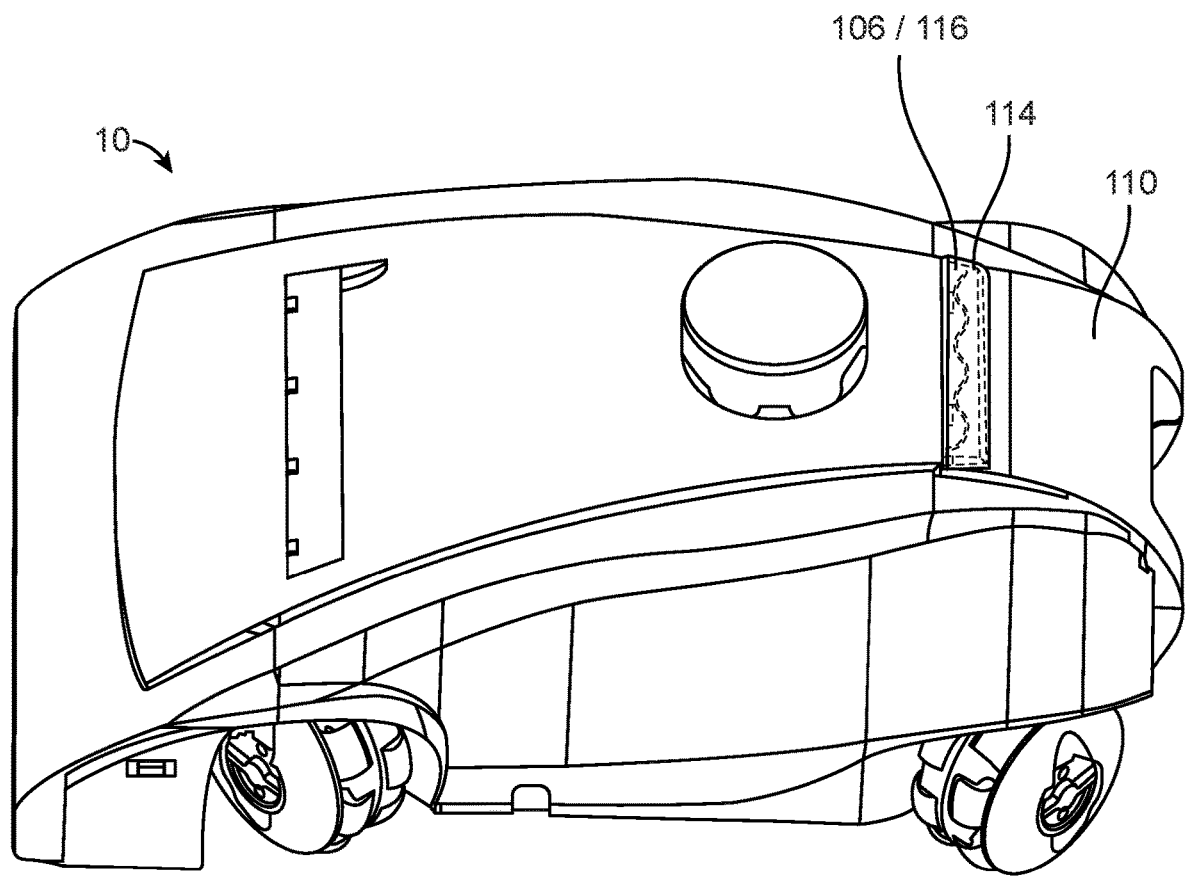
FIG. 11 is a top perspective view schematic representation of a robot with a battery pack installed in the socket, according to an embodiment.

Referring now to FIG. 11, there is shown a top perspective view schematic representation of a robot 10 with a battery pack 100 installed in the socket 46, according to an embodiment. The battery pack 100 can be easily placed in the socket 46 of the robot 10, as shown in FIG. 11. The connector 48 of the battery pack 100 mates with the connector 48 of the robot 10. Via the connectors 48, the robot 10 and communicates with the BMS 104.

During operation of the robot 10, a user can inquire about the charge status of the battery pack(s) 100 by touching the translucent top cover 118 of the housing 110 of the battery pack(s) 100 in the same manner as when a battery pack 100 is removed from the robot 10. As mentioned above, the BMS 104 communicates the charge status of the battery pack 100 to the robot 10 via the connectors 108, 48. The robot 10 may comprise a speaker, display (e.g., screen), wireless communication (e.g., web-based or SMS-based notifications), and one or more light (e.g., LED) indicators for notification purposes. For example, the robot 10 can emit sounds via the speaker, display words on a screen, send status messages and emergency signals via SMS notifications to a receiving station (e.g., human or machine), and flash LED lights to alert a user that a battery pack 100 needs replacement (or has a charge status below a minimum threshold).

In an embodiment, the robot 10 may compare the charge status of a battery pack 100 with the requirements ("a required charge") for the requested service. If the charge status of the battery pack 100 indicates a charge below the requested charge, then the robot 10 can transmit an alert that there is insufficient charge in the battery pack 100 to complete the requested service.

In another embodiment, the robot 10 comprises a reserve power supply. The reserve power supply can be a super capacitor that is wired in parallel with the battery pack 100. The battery pack 100 initially charges the super capacitor. When the battery pack 100 is removed from the robot 10 for replacement, the super capacitor maintains the supply of power to the robot 10 during the brief interruption caused by swapping the batteries. The robot 10 is configured to detect removal of the battery pack 100 and may, consequently, transmit any alerts or events and allow for a graceful (or safe) shutdown of its computing system or other essential electronic components of the robot 10. The graceful shutdown is critical to preventing loss of data and creating a quicker restart when power from a newly installed battery pack 100 is received. In another embodiment, if the battery pack 100 is replaced within a time window, the robot 10 (via its computing system) can continue the task (requested service) where it left off without waiting for rebooting or requiring further interaction.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A robotic vacuum cleaner, comprising:
    a main body having a front, top and bottom;
    a vacuum source positioned at the front of the main body;
    a plurality of sensor elements mounted to the main body;
    a plurality of wheel assemblies that collectively form a holonomic drive, each wheel assembly comprising:
        a motor;
        a drive wheel connected to the motor;

an encoder;
and a motor controller;
a main controller that receives odometry data from each motor controller in regard to the movement of each respective wheel, and data from the plurality of sensor elements, and provides electronic navigation control to the plurality of wheel assemblies;
a socket including a connector;
a removable, chargeable battery system within the socket on the main body, comprising:
a battery pack with one or more batteries;
a battery management system extending across all of the one or more batteries of the battery pack;
a housing configured to store the battery pack and the battery management system therein, the housing also having a translucent top cover, which extends over the battery management system and which forms a top surface of the main body of the robotic vacuum cleaner when the removable, chargeable battery system is within the socket;
a circuit board within the top cover of the housing, the circuit board including a light source to illuminate through the translucent top cover of the housing, and the circuit board including a touch sensor to control the light source to indicate a charge status of the battery pack when a touch is sensed;
a connector of the removable, chargeable battery system at least partially connected to the battery management system and extending through the housing; and wherein the connector of the removable, chargeable battery system is configured to transmit signals between the battery management system and the main controller via the connector of the socket.

2. The robotic vacuum cleaner of claim 1, wherein the touch sensor comprises a capacitive touch sensor.

3. The robotic vacuum cleaner of claim 1, wherein the light source comprises LED lights.

4. The robotic vacuum cleaner of claim 1, wherein the connector is configured to mate with a connector of a charging station.

5. The robot vacuum cleaner of claim 4, wherein the housing is configured to fit within a slot on the charging station.

6. The robot vacuum cleaner of claim 1, wherein the housing further forms a back surface of the main body opposite the vacuum source of the robotic vacuum cleaner when the removeable, chargeable battery system is within the socket.

7. The robot vacuum cleaner of claim 1, further comprising:
a reserve power supply charged by the removeable, chargeable batter system when the removeable, chargeable battery system is within the socket, the reserve power supply to supply power to the robot vacuum cleaner when the removeable, chargeable battery system is removed.

* * * * *